Nov. 3, 1936.  A. H. DOLGE  2,059,320

CHURCH TRUCK

Filed May 22, 1936

Inventor
A. H. Dolge
By Mason Fenwick & Lawrence
Attorneys

Patented Nov. 3, 1936

2,059,320

UNITED STATES PATENT OFFICE 2,059,320

CHURCH TRUCK

Arthur H. Dolge, Westport, Conn., assignor to The Embalmers' Supply Company, Westport, Conn., a corporation of Connecticut Application May 22, 1936, Serial No. 81,313

3 Claims. (Cl. 27—27)

This invention is in the nature of an improvement on the collapsible church or casket truck disclosed in my U. S. Patent No. 1,919,103, July 18, 1933.

The truck disclosed in my aforesaid U. S. patent was not adapted to support in collapsed position the drapery commonly used around the truck in extended position; primarily because the truck lacked anything between the legs or standards capable of supporting the upper edge of the drapery level with the upper ends of said legs.

It is the object of the present invention to change the structural relation of certain parts of my patented truck, and to add other drapery supporting elements which adapt the truck for properly supporting the drapery in both extended and folded position.

Other objects of the invention will become apparent as the detailed description thereof proceeds.

Figures 1, 2, 3, 4:
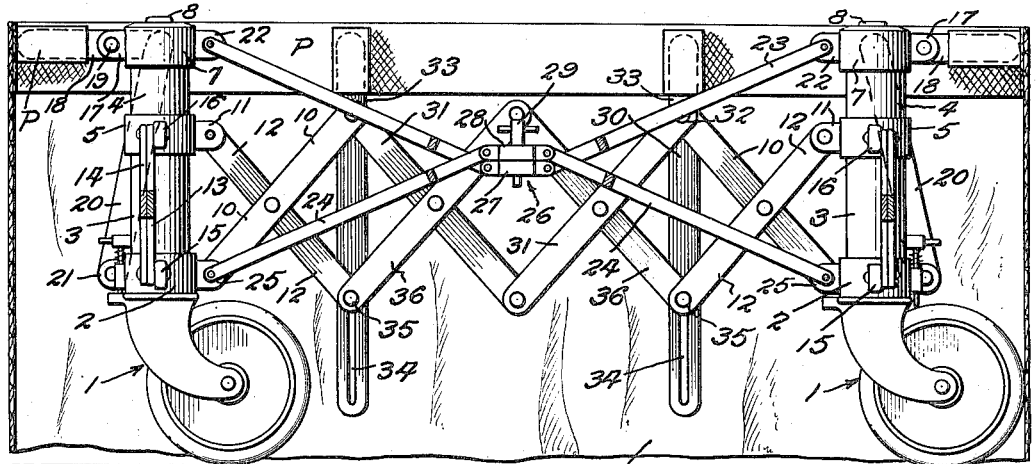
Figure 1 is a central vertical section through my improved truck with the several parts thereof shown in extended relation.
Figure 2 is a section similar to Figure 1; but showing the parts thereof in collapsed relation.
Figure 3 is a side elevation of the truck, collapsed as shown in Figure 2.
Figure 4 is a fragmentary plan of the truck with the parts in extended relation.

As shown in the drawing, the casters 1 are mounted to rotate in ball bearing collars 2 suitably secured to the lower ends of a hollow standard 3. The standards 3 slidably receive inner standards 4, (see Figure 3) one telescoping within the other.

Collars 5 are adjustably secured to the standards 4 by the set screws 6. Caps 7 are suitably secured to the upper ends of the solid standards and are provided with the usual rubber cushions 8.

The collars 2 are provided with lugs 9 (see Figure 4) to which are pivoted the lower ends of the lazy tong bars 10. The collars 5 are also provided with lugs 11 to which are pivoted the lazy tong bars 12. These lazy tong bars constitute the long or side tongs, the corresponding shorter end tongs being indicated by the reference numerals 13 and 14 pivoted to lugs 15 and 16 projecting from the collars 2 and 5, respectively.

Each cap 7 is provided with an outwardly extending lug 17 having handle bar 18 pivoted thereto between its ends by the pivot pin 19. A link 20 is pivoted at its upper end to the inner end of handle bar 18, and is pivoted at its lower end to a lug 21 extending outwardly from the collar 2. The arrangement of these parts is such that when the truck is collapsed the handles extend above the caps 7, as shown in Figures 2 and 3, instead of below the caps as shown in my patented device.

Lugs 22 extend inwardly and diagonally from the caps 7, and have pivoted thereto the bars 23, while bars 24 are pivoted to lugs 25 extending inwardly and diagonally from the collars 2. Arranged at the inner ends of the bars 23 and 24 is a locking device 26 comprising the cooperating heads 27 and 28, and a locking bolt 29 rotatable axially in head 28. This mechanism operates in the same manner as in my patented device to lock the heads 27 and 28 together when the truck is extended as shown in Figure 1.

In order to support the drapery D with its upper level with the upper ends of the standards, I have pivoted a slotted link 30 to the bars 10 and 31 of the lazy tongs by their common pivot 32; with a part 33 thereof projecting above pivot 32 through a distance which locates the upper end of link 30 about level with the tops of the caps 7.

The lower part of the link 30 is provided with a slot 34 which slidably engages the pivot 35 connecting lazy tong bar 12 to another such bar 36.

The drapery D is provided at its upper edge with pockets P which receive the upper ends of the links 33, and the handles 18. When the truck is in extended position the top edge of the drapery is substantially horizontal and flush with the tops of the caps 7. When the truck is collapsed, as shown in Figure 2, the drapery is fully supported by the link 33 and handles 18, which as shown in Figures 2 and 3 are inclined upwardly so as to preclude all possibility of the drapery sliding off the supporting elements of the truck.

It is to be understood that the invention is not to be considered as limited to the specific construction and arrangement described herein, since it is evident that many changes may be made without departing from the scope of the invention as defined by the claims appended hereto.

What I claim is:

1. A collapsible church truck including two pairs of standards, lazy tongs connecting the standards of each pair to each other, lazy tongs connecting the standards of one pair to the standards of the other pair, means for limiting the extension of said standards and lazy tong mechanism, and links pivoted to parts of the last named lazy tongs and slidably connected to other parts of said lazy tongs and constructed to have their upper ends substantially level with the upper ends of said standards in both extended and collapsed positions of the truck.

2. A collapsible church truck including two pairs of standards, lazy tongs connecting the standards of each pair to each other, lazy tongs connecting the standards of one pair to the standards of the other pair, means for limiting the extension of said standards and lazy tong mechanism, links pivoted to parts of the last named lazy tongs and slidably connected to other parts of said lazy tongs and constructed to have their upper ends substantially level with the upper ends of said standards in both extended and collapsed positions of the truck, handles pivoted to the upper ends of said standards, and means for holding said handles substantially horizontal when the truck is fully extended and for moving the handles upwardly and outwardly of the standards during the movements of the truck from extended to collapsed positions.

3. A collapsible church truck including two pairs of standards, lazy tongs connecting the standards of each pair to each other, lazy tongs connecting the standards of one pair to the standards of the other pair, means for limiting the extension of said standards and lazy tong mechanism, links pivoted to parts of the last named lazy tongs and slidably connected to other parts of said lazy tongs and constructed to have their upper ends substantially level with the upper ends of said standards in both extended and collapsed positions of the truck, handles pivoted between their ends to the upper ends of said standards, and means pivoted to the inner ends of said handles to raise the handles upwardly and outwardly of said standards during the movements of the truck from extended to collapsed positions.

ARTHUR H. DOLGE.